(12) United States Patent
Lehman et al.

(10) Patent No.: US 9,909,468 B2
(45) Date of Patent: Mar. 6, 2018

(54) FLUID CONDITIONING SYSTEM WITH RECIRCULATION LOOP AND METHOD FOR OPERATING SAME

(71) Applicant: Caterpillar Inc., Peoria, IL (US)

(72) Inventors: Martin Lehman, Congerville, IL (US); Scott F. Shafer, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 177 days.

(21) Appl. No.: 14/834,833

(22) Filed: Aug. 25, 2015

(65) Prior Publication Data
US 2017/0058728 A1   Mar. 2, 2017

(51) Int. Cl.
| | |
|---|---|
| F02M 37/04 | (2006.01) |
| F02M 37/00 | (2006.01) |
| F01M 1/12 | (2006.01) |
| F01M 1/02 | (2006.01) |
| F01M 1/10 | (2006.01) |
| F01M 1/16 | (2006.01) |
| F16N 39/00 | (2006.01) |

(52) U.S. Cl.
CPC ............. *F01M 1/12* (2013.01); *F01M 1/02* (2013.01); *F01M 1/10* (2013.01); *F01M 1/16* (2013.01); *F16N 39/00* (2013.01); *F01M 2001/1092* (2013.01); *F01M 2001/123* (2013.01)

(58) Field of Classification Search
CPC .. F01M 1/12; F01M 1/02; F01M 1/10; F01M 2001/1092; F01M 2001/123; B01D 35/005; B01D 35/147; B01D 29/885; B01D 35/18; B01D 29/00; B01D 35/1573; F02M 37/14; F02M 2200/27; F02M 37/22

USPC .............. 123/495, 446, 65 B, 338, 497, 510, 123/198 C; 210/196, 136, 805, 195.1, 210/709, 712, 181, 97

See application file for complete search history.

(56) References Cited

U.S. PATENT DOCUMENTS

| | | | | |
|---|---|---|---|---|
| 3,090,365 | A | * | 5/1963 | Constantino ............. F01M 1/12 123/41.08 |
| 5,887,562 | A | * | 3/1999 | von Esebeck ........... F01M 1/12 123/196 AB |
| 5,900,155 | A | | 5/1999 | Bedi |
| 5,972,210 | A | | 10/1999 | Munkel |
| 6,358,022 | B1 | | 3/2002 | Frank et al. |

(Continued)

FOREIGN PATENT DOCUMENTS

| | | |
|---|---|---|
| CN | 102913734 A | 2/2013 |
| CN | 204025018 U | 12/2014 |

(Continued)

*Primary Examiner* — Lindsay Low
*Assistant Examiner* — Syed O Hasan
(74) *Attorney, Agent, or Firm* — Joell R. Hibshman, II; John P. Wappel

(57) ABSTRACT

A fluid conditioning system includes a recirculation pump fluidly coupled to a reservoir via a first conduit; a delivery pump fluidly coupled in series with the recirculation pump, such that an outlet of the recirculation pump is fluidly coupled to an inlet of the delivery pump via a second conduit; and a recirculation loop including a recirculation filter, an inlet of the recirculation filter being fluidly coupled to the second conduit, and an outlet of the recirculation filter being fluidly coupled to the first conduit. The recirculation pump is configured to operate at a flow rate that is higher than a flow rate of the delivery pump.

20 Claims, 4 Drawing Sheets

(56) References Cited

U.S. PATENT DOCUMENTS

| | | |
|---|---|---|
| 6,474,289 B1 | 11/2002 | Lilly et al. |
| 6,758,656 B2 | 6/2004 | Maier et al. |
| 7,112,278 B2 | 9/2006 | Yamada et al. |
| 7,765,990 B2 | 8/2010 | Braun et al. |
| 8,844,503 B2 | 9/2014 | Worthington et al. |
| 8,888,658 B2 | 11/2014 | Pritchard |
| 2004/0103883 A1 | 6/2004 | Geyer |
| 2004/0118764 A1 | 6/2004 | Miller et al. |
| 2007/0186877 A1 | 8/2007 | Schulz |
| 2009/0025268 A1 | 1/2009 | Bender |
| 2009/0095689 A1 | 4/2009 | Keenan |
| 2009/0145823 A1 | 6/2009 | Lauer et al. |
| 2011/0048548 A1 | 3/2011 | Rahm |
| 2011/0232270 A1* | 9/2011 | Burkitt ................. F01N 3/0253 60/286 |
| 2012/0216778 A1 | 8/2012 | Fulton et al. |
| 2012/0279590 A1 | 8/2012 | Wilkinson et al. |
| 2012/0255521 A1 | 10/2012 | Aoki et al. |
| 2013/0036738 A1 | 2/2013 | Pora |
| 2013/0126408 A1 | 5/2013 | Konig et al. |
| 2013/0287594 A1* | 10/2013 | Oyori ..................... F04B 49/06 417/2 |
| 2014/0021118 A1 | 1/2014 | Rahm |
| 2014/0183112 A1 | 7/2014 | Ahmad |
| 2014/0224215 A1 | 8/2014 | Lehman et al. |
| 2014/0331974 A1* | 11/2014 | Ahmad ................. F02M 37/04 123/495 |
| 2015/0014254 A1 | 1/2015 | Jensen et al. |

FOREIGN PATENT DOCUMENTS

| | | |
|---|---|---|
| CN | 104358557 A | 2/2015 |
| EP | 1778960 B1 | 1/2010 |
| JP | 62-1424 A | 1/1987 |
| JP | 200831961 | 2/2008 |
| JP | 2013117186 | 6/2013 |
| KR | 1020100006366 | 1/2010 |
| KR | 101287156 | 7/2013 |
| WO | 2014040863 | 3/2014 |

* cited by examiner

FLUID CONDITIONING SYSTEM WITH RECIRCULATION LOOP AND METHOD FOR OPERATING SAME

TECHNICAL FIELD

The present disclosure relates generally to fluid conditioning systems and, more particularly, to fluid filtration systems with a recirculation loop.

BACKGROUND

Reciprocating internal combustion (IC) engines are known for converting chemical energy, stored in a fuel supply, into mechanical shaft power. A fuel-oxidizer mixture is received in a variable volume of an IC engine defined by a piston translating within a cylinder bore. The fuel-oxidizer mixture burns inside the variable volume to convert chemical energy from the mixture into heat. In turn, expansion of the combustion products within the variable volume performs work on the piston, which may be transferred to an output shaft of the IC engine.

Engines may include one or more fluid sub-systems, such as, lubrication systems, hydraulic systems, coolant systems, fuel systems, or combinations thereof. Filtration structures and methods have been employed in engine fluid sub-systems to remove debris from fluids contained therein.

US Patent Publication No. 2015/0014254 (the '254 publication), titled "Method and System for Cleaning Degraded Oil," purports to address the problem of cleaning degraded oil comprising oil-soluble degradation products. The '254 publication describes a system for cleaning degraded oil including a recirculation branch where a cooler is arranged downstream of a filter, and precipitation by cooling is performed by mixing the degraded oil with recirculated cooled oil at a recombination point.

However, the system of the '254 publication may be too bulky and expensive for use in some applications. Accordingly, there is a need for improved fluid conditioning systems to address the aforementioned problems and/or other problems in the art.

It will be appreciated that this background description has been created to aid the reader, and is not a concession that any of the indicated problems were themselves known previously in the art.

SUMMARY

According to an aspect of the disclosure, a fluid conditioning system comprises a recirculation pump fluidly coupled to a reservoir via a first conduit; a delivery pump fluidly coupled in series with the recirculation pump, such that an outlet of the recirculation pump is fluidly coupled to an inlet of the delivery pump via a second conduit; and a recirculation loop including a recirculation filter, an inlet of the recirculation filter being fluidly coupled to the second conduit, and an outlet of the recirculation filter being fluidly coupled to the first conduit. The recirculation pump is configured to operate at a flow rate that is higher than a flow rate of the delivery pump.

According to another aspect of the disclosure, an engine comprises a recirculation pump fluidly coupled to a fluid reservoir via a first conduit; a delivery pump fluidly coupled in series with the recirculation pump, such that an outlet of the recirculation pump is fluidly coupled to an inlet of the delivery pump via a second conduit; an engine component defining a fluid flow path therein, the fluid flow path being fluidly coupled to an outlet of the delivery pump; and a recirculation loop including a recirculation filter, an inlet of the recirculation filter being fluidly coupled to the second conduit, and an outlet of the recirculation filter being fluidly coupled to the first conduit. The recirculation pump is configured to operate at a flow rate that is higher than a flow rate of the delivery pump.

Another aspect of the disclosure provides a method for conditioning a fluid. The method comprises receiving a first fluid flow from a reservoir at an inlet of a recirculation pump; pumping the first fluid flow through the recirculation pump; splitting the first fluid flow into a second fluid flow and a third fluid flow downstream of an outlet of the recirculation pump; pumping the second fluid flow through a delivery pump that is fluidly coupled in series with the recirculation pump, a flow rate of the second fluid flow being less than a flow rate of the first fluid flow; filtering the third fluid flow through a recirculation conduit; and pumping the third fluid flow through the recirculation pump after the filtering the third fluid flow.

DETAILED DESCRIPTION

Aspects of the disclosure will now be described in detail with reference to the drawings, wherein like reference numbers refer to like elements throughout, unless specified otherwise.

Figure 1:
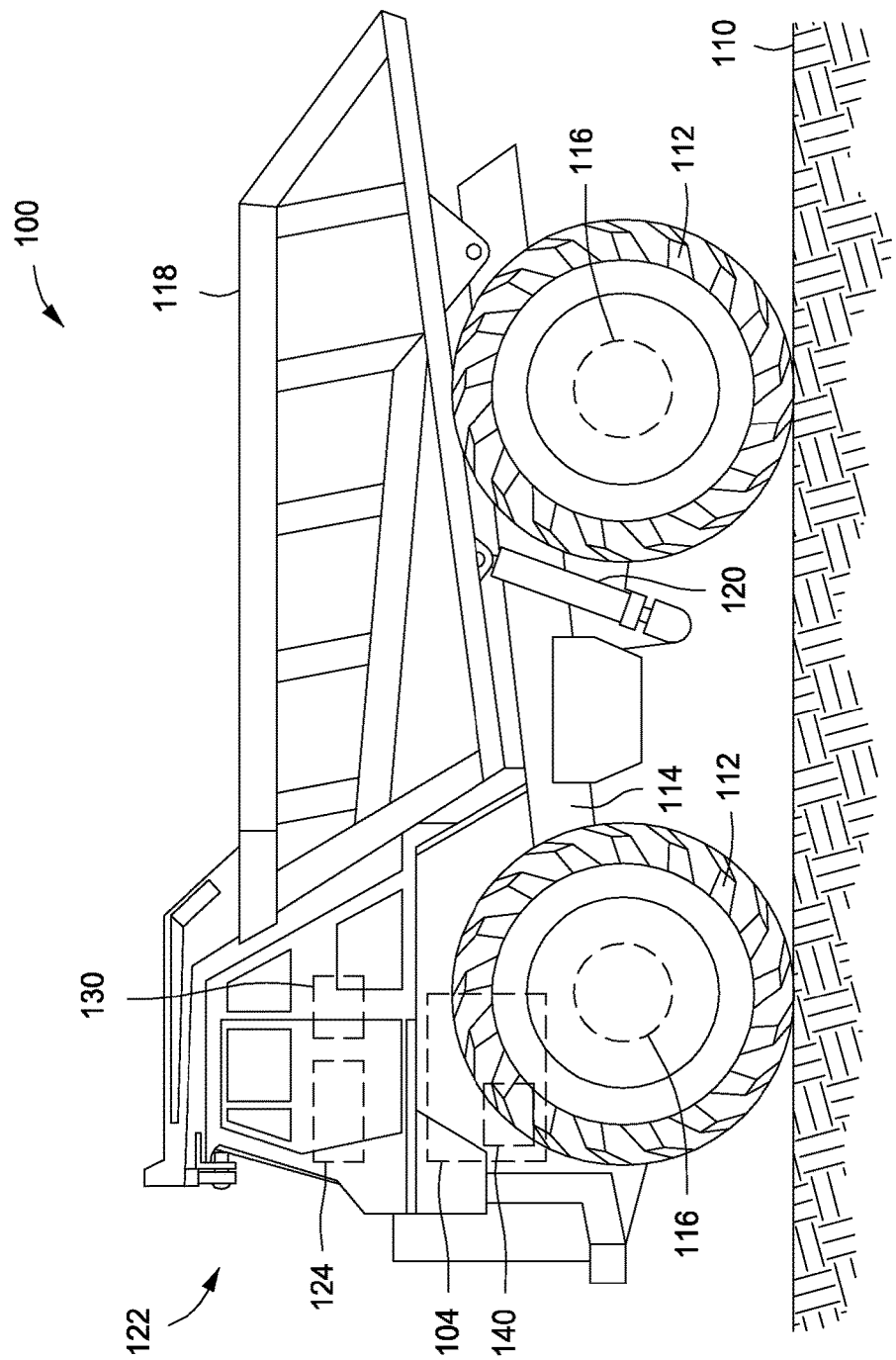
FIG. 1 is a schematic side view of a machine, according to an aspect of the disclosure.

FIG. 1 shows a side view of a machine 100, according to an aspect of the disclosure. The machine 100 includes an IC engine 104, which maybe a reciprocating internal combustion engine, such as a compression ignition engine or a spark ignition engine, for example, or a rotating internal combustion engine, such as a gas turbine, for example.

The machine 100 may be propelled over a work surface 110 by wheels 112 coupled to a chassis 114. The wheels 112 may be driven by motors 116, a mechanical transmission coupled to the IC engine 104, or combinations thereof. It will be appreciated that the machine 100 could also be propelled by tracks (not shown), combinations of wheels 112 and tracks, or any other surface propulsion device known in the art. Alternatively, the machine 100 could be a stationary machine, and therefore may not include a propulsion device.

The machine 100 may also include a work implement 118 driven by an actuator 120. The work implement 118 could be a dump bed, a shovel, a drill, a fork lift, a feller-buncher, a conveyor, or any other implement known in the art for performing work on a load. The actuator 120 may be a hydraulic actuator, such as a linear hydraulic motor or a rotary hydraulic motor, an electric motor, a pneumatic actuator, or any other actuator known in the art.

The machine may include a cab 122 configured to accommodate an operator, and have a user interface 124 including input devices for asserting control over the machine 100. The user interface 124 may include pedals, wheels, joysticks, buttons, touch screens, combinations thereof, or any other user input device known in the art. Alternatively or additionally, the user interface 124 may include provisions for receiving control inputs remotely from the cab 122, including wired or wireless telemetry, for example. The IC engine 104 and the user interface 124 may be operatively coupled to one another via a controller 130.

The machine 100 may be an "over-the-road" vehicle such as a truck used in transportation, or may be any other type of machine that performs some type of operation associated with an industry such as mining, construction, farming, transportation, or any other industry known in the art. For example, the machine may be an off-highway truck; an earth-moving machine, such as a wheel loader, an excavator, a dump truck, a backhoe, a motor grader, or a material handler; a marine vessel; a locomotive; or any other machine known in the art. The term "machine" can also refer to stationary equipment, such as a generator that is driven by an internal combustion engine to generate electricity; a pump or a compressor that is driven by an internal combustion engine, or any other stationary-drive machine known in the art. The specific machine 100 illustrated in FIG. 1 is a dump truck having a dump bed 118 actuated by a linear hydraulic cylinder 120.

Figure 2:
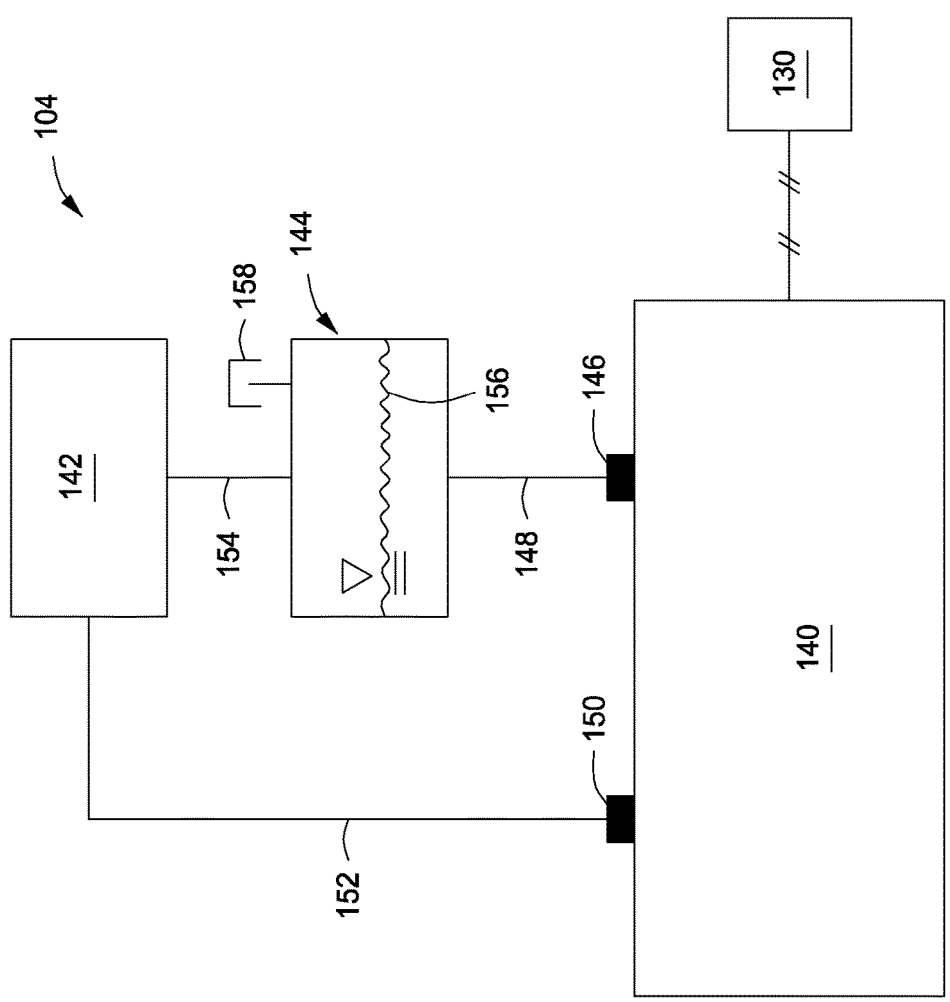
FIG. 2 is a schematic view of an engine, according to an aspect of the disclosure.

FIG. 2 is a schematic view of an engine 104, according to an aspect of the disclosure. The engine 104 includes a fluid conditioning system 140, an engine component 142, and a fluid reservoir 144.

An inlet port 146 of the fluid conditioning system 140 is in fluid communication with the fluid reservoir 144 via an inlet conduit 148, and an outlet port 150 of the fluid conditioning system 140 is in fluid communication with the engine component 142 via an outlet conduit 152. Accordingly, the fluid conditioning system 140 may receive a fluid from the fluid reservoir 144, condition the fluid by adjusting at least one property of the fluid, and then deliver the conditioned fluid to the engine component 142. The engine component 142 may optionally be in fluid communication with the fluid reservoir 144 via a return conduit 154.

The fluid conditioning system 140 may include pumps, filters, valves, fluid conduits, storage tanks, sensors, actuators, heaters, coolers, chemical reactors, or any other structures known in the art to benefit the conditioning of fluids. Accordingly, the at least one property of the fluid that is adjusted by the fluid conditioning module may include a mixture composition, a pressure, a temperature, a chemical composition, combinations thereof, or any other fluid property known in the art. The fluid conditioning system 140 may be operatively coupled to the controller 130 for communication of data signals, control signals, or both, therebetween.

The engine component 142 may be an engine block, an intake manifold, an exhaust manifold, a fuel injector, a hydraulic actuator, combinations thereof, or any other engine component known in the art to receive a fluid. According to an aspect of the disclosure, the engine component 142 is an engine block, and the engine block defines therein a cooling fluid passage, a lubricating oil passage, combinations thereof, or any other engine block fluid passage known in the art. According to another aspect of the disclosure, the engine component 142 is a hydraulic actuator for a fuel injector, such as a hydraulic electric unit injector (HEUI), for example, and the hydraulic actuator may receive pressurized lubricating oil from the fluid conditioning system 140 to drive operation of the hydraulic actuator.

The fluid stored in the fluid reservoir 144 may include lubricating oil, hydraulic oil, fuel, coolant, air, combinations thereof, or any other fluid known in the art to benefit operation of the IC engine 104. According to an aspect of the disclosure, the fluid reservoir 144 is a fluid sump, such that fluid stored therein forms a free surface 156 with another fluid, such as atmospheric air, for example. According to another aspect of the disclosure, the fluid reservoir 144 is in fluid communication with an ambient environment of the engine 104 via a vent 158.

Figure 3:
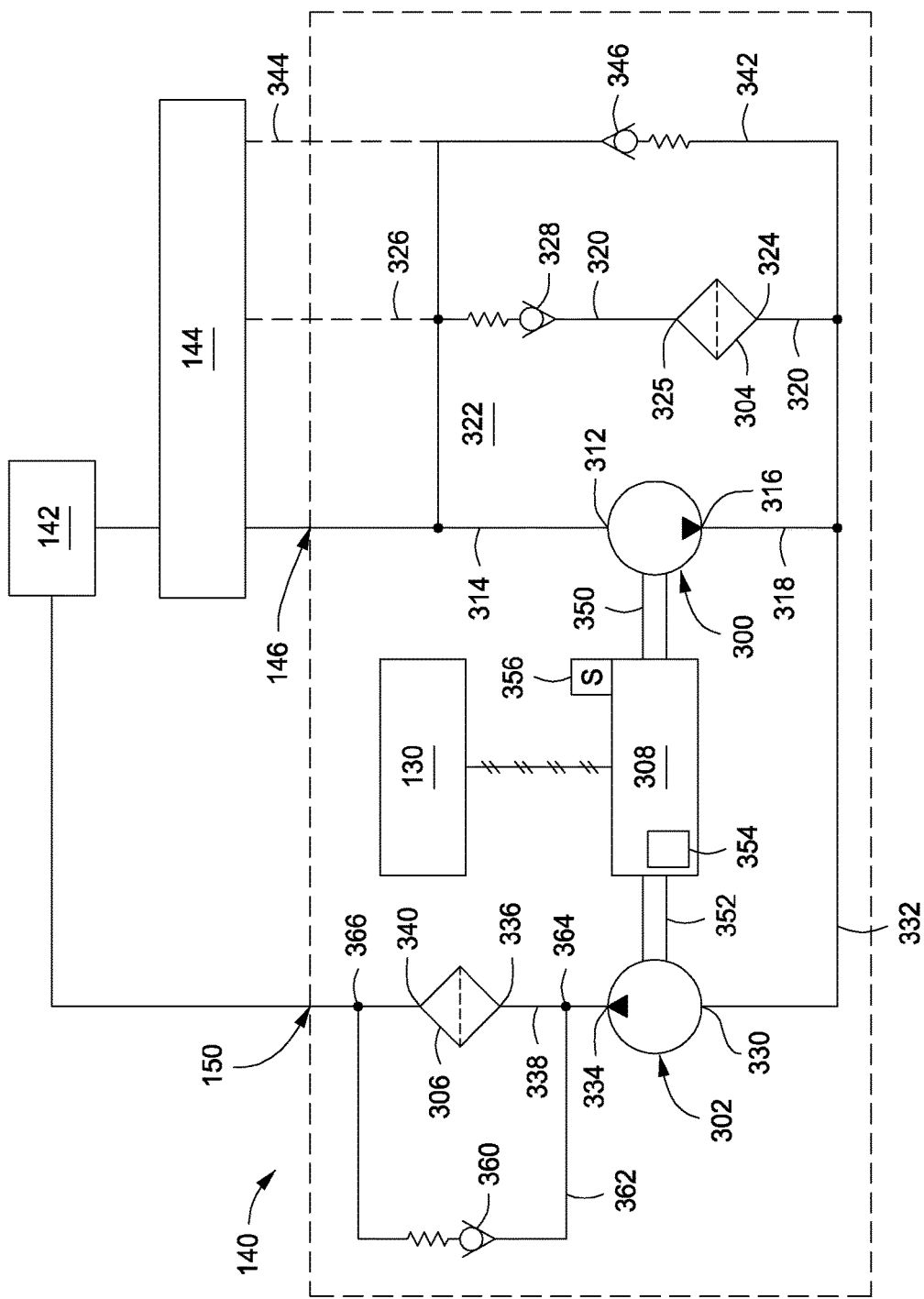
FIG. 3 is a schematic view of a fluid conditioning system, according to an aspect of the disclosure.

FIG. 3 is a schematic view of a fluid conditioning system 140, according to an aspect of the disclosure. The fluid conditioning system 140 illustrated in FIG. 3 includes a recirculation pump 300, a delivery pump 302, a prime mover 308, a recirculation filter 304, and a delivery filter 306.

An inlet 312 to the recirculation pump 300 is fluidly coupled to the inlet port 146 of the fluid conditioning system 140, and therefore the fluid reservoir 144, via a recirculation pump inlet conduit 314. An outlet 316 from the recirculation pump 300 is fluidly coupled to the inlet 312 of the recirculation pump 300 via a recirculation pump outlet conduit 318 and a recirculation conduit 320. Alternatively or additionally, the outlet 316 of the recirculation pump 300 may be fluidly coupled to the reservoir 144 via the conduit 326. Accordingly, the recirculation pump outlet conduit 318, the recirculation conduit 320, and the recirculation pump inlet conduit 314 form a fluid recirculation loop 322.

The fluid recirculation loop 322 includes the recirculation filter 304 having an inlet 324 and an outlet 325, and a check valve 328. The recirculation filter 304 is configured to separate debris from a fluid flowing therethrough. The check valve 328 is arranged along the recirculation loop 322 to allow flow only in a direction from the outlet 316 of the recirculation pump 300 toward the inlet 312 of the recirculation pump 300 via the recirculation conduit 320.

An inlet 330 to the delivery pump 302 is fluidly coupled in series with the outlet 316 of the recirculation pump 300 via a delivery pump inlet conduit 332, and an outlet 334 of the delivery pump 302 is fluidly coupled to an inlet 336 of the delivery filter 306 via a delivery filter inlet conduit 338. An outlet 340 of the delivery filter is fluidly coupled to the outlet port 150 of the fluid conditioning system 140. The delivery filter 306 is configured to separate debris from a fluid flowing therethrough, and may include multiple filter stages arranged fluidly in series.

The inlet 330 of the delivery pump 302 is also fluidly coupled to the inlet port 146 of the fluid conditioning system 140 via a bypass conduit 342. Alternatively or additionally, the inlet 330 of the delivery pump 302 is fluidly coupled to the reservoir 144 via a conduit 344. The bypass conduit 342 includes a check valve 346 that is arranged to allow flow only in a direction from the reservoir 144 toward the inlet 330 of the delivery pump 302.

According to an aspect of the disclosure, the delivery pump inlet conduit 332 is mechanically fixed to the inlet 330 of the delivery pump 302. According to another aspect of the disclosure, the delivery pump inlet conduit 332 is a closed conduit that couples with the inlet 330 of the delivery pump 302 in sealing engagement. According to another aspect of the disclosure, the fluid path from the outlet 316 of the recirculation pump 300 to the inlet 330 of the delivery pump 302 is a closed conduit, which does not include a reservoir that is open to an ambient environment of the fluid conditioning system 140.

The fluid conditioning system 140 may optionally include a check valve 360 arranged along a filter bypass conduit 362. The filter bypass conduit 362 is fluidly arranged in parallel with the delivery filter 306 from an inlet fluid node 364 to an outlet fluid node 366. The inlet fluid node 364 is disposed downstream of the delivery pump 302 and upstream of the delivery filter 306, and the outlet fluid node 366 is disposed downstream of the delivery filter 306 and upstream of the engine component 142. The check valve 360 is configured to allow flow through the filter bypass conduit 362 when a pressure drop across the delivery filter 306 exceeds a threshold value, and only in a direction from inlet fluid node 364 to the outlet fluid node 366. Thus, the filter bypass conduit 362 may bypass a flow of fluid around the delivery filter 306 in the event that the delivery filter 306 becomes too restrictive to fluid flow.

According to an aspect of the disclosure, the recirculation pump 300 may be a turbomachine, such as, for example, a centrifugal pump. According to another aspect of the disclosure, the delivery pump 302 may have a positive displacement design, such as, for example, a gerotor or external gear pump construction. However, it will be appreciated that either the recirculation pump 300 or the delivery pump 302 may be a turbomachine, a positive displacement pump, or any other pump known in the art, to satisfy the needs of a particular application.

FIG. 3 shows the recirculation pump 300 and the delivery pump 302 each operatively coupled to a common prime mover 308 via a first shaft 350 and a second shaft 352, respectively, for transmission of shaft power therebetween. The prime mover 308 may be shaft power derived directly from a crankshaft of the engine 104, for example, such that a rotational speed of the prime mover 308 is functionally related to a rotational speed of the crankshaft of the engine 104. Alternatively, the prime mover 308 may be a motor that is distinct from the engine 104 crankshaft drive train, and that is instead powered by electrical power, hydraulic power, pneumatic power, combinations thereof, or any other motor power source known in the art, such that a speed of the prime mover 308 is independent from a rotational speed of the crankshaft of the engine 104. It will be appreciated that shaft power derived directly from the crankshaft of the engine 104 may include shaft power that is operatively coupled to the crankshaft of the engine 104 via a gear train, a drive belt and pulley train, or other mechanical transmission known in the art.

According to an aspect of the disclosure, the prime mover 308 is configured to drive the first shaft 350 at the same angular velocity as the second shaft 352. According to another aspect of the disclosure, the prime mover 308 may include gearing 354 that is operatively coupled to the first shaft 350, the second shaft 352, or both, such that an angular velocity for the first shaft 350 is different from the angular velocity of the second shaft 352 according to a prescribed relationship as a function of an angular velocity of the prime mover 308. It will be appreciated that the gearing 354 may include meshed-toothed gears, drive belt pulleys, combinations thereof, or any gearing known in the art to vary a rotational speed between two operatively coupled shafts.

The prime mover 308 may include a speed sensor 356 that is operatively coupled to the controller 130 for transmitting a signal to the controller 130 that is indicative of a speed of the prime mover 308.

According to an aspect of the disclosure, the prime mover 308 is a variable speed motor and the controller 130 is configured to vary a rotational speed of the prime mover 308. According to another aspect of the disclosure, the prime mover 308 is a constant speed motor, and the controller 130 is configured to actuate the prime mover 308 between a stopped condition and a fixed-speed condition.

The controller 130 may be any purpose-built processor for effecting control of the fluid conditioning system 140. It will be appreciated that the controller 130 may be embodied in a single housing, or a plurality of housings distributed throughout the fluid conditioning system 140. Further, the controller 130 may include power electronics, preprogrammed logic circuits, data processing circuits, volatile memory, non-volatile memory, software, firmware, input/output processing circuits, combinations thereof, or any other controller structures known in the art.

Figure 4:
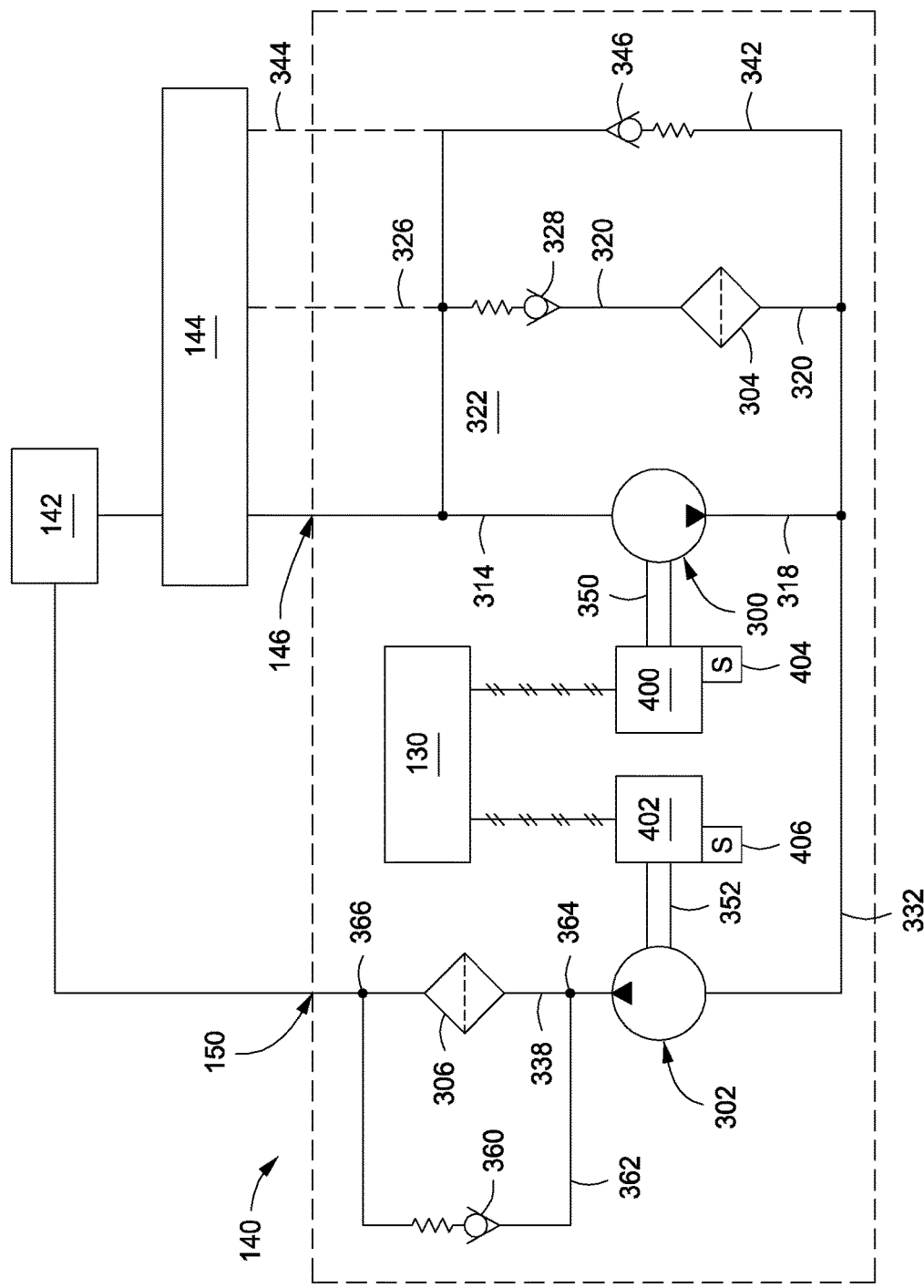
FIG. 4 is a schematic view of a fluid conditioning system, according to an aspect of the disclosure.

FIG. 4 is a schematic view of a fluid conditioning system 140, according to an aspect of the disclosure. Similar to the fluid conditioning system 140 illustrated in FIG. 3, the fluid conditioning system 140 illustrated in FIG. 4 includes a recirculation pump 300, a delivery pump 302, a recirculation filter 304, and a delivery filter 306. However, in FIG. 4, the fluid conditioning system 140 includes a first prime mover 400 operatively coupled to the recirculation pump 300 via a first shaft 350, and a second prime mover 402 operatively coupled to the delivery pump 302 via a second shaft 352.

Either the first prime mover 400 or the second prime mover 402 may be shaft power derived directly from a crankshaft of the engine 104, or a motor that is distinct from the crankshaft drive train of the engine 104, such as a motor that is operated by separate electrical power, hydraulic power, pneumatic power, shaft power, or combinations thereof. According to an aspect of the disclosure, the second prime mover 402 is shaft power derived directly from the engine 104, and the first prime mover 400 is a motor that is distinct from a crankshaft drive train of the engine, such that the first prime mover 400 is free to operate independently from the second prime mover 402. However, it will be appreciated that the first prime mover 400 and the second prime mover 402 may be powered by other combinations of sources to suit other applications.

The delivery pump 302 is free from mechanical coupling with the first prime mover 400 via the second shaft 352, and the recirculation pump 300 is free from mechanical coupling with the second prime mover 402 via the first shaft 350. Further, the first prime mover 400 may be operatively coupled to the controller 130 separately and distinctly from a coupling between the second prime mover 402 and the controller 130. Accordingly, the controller 130 may effect independent control over the recirculation pump 300 and the delivery pump 302 as illustrated in FIG. 4.

The first prime mover 400 may include a speed sensor 404 that is operatively coupled to the controller 130 for transmitting a signal to the controller 130 that is indicative of a speed of the first prime mover 400. The second prime mover 402 may include a speed sensor 406 that is operatively coupled to the controller 130 for transmitting a signal to the controller 130 that is indicative of a speed of the second prime mover 402.

According to an aspect of the disclosure, the controller 130 is configured to vary a speed of the first prime mover 400, the second prime mover 402, or both. According to another aspect of the disclosure, the controller 130 is configured to vary a speed of the second prime mover 402 and operate the first prime mover 400 at a constant speed.

INDUSTRIAL APPLICABILITY

The present disclosure is applicable to fluid conditioning systems in general, and more particularly to fluid conditioning systems including recirculating filtration loops.

Removing debris from fluids within an engine may help to promote the useful life of the fluid, the useful life of engine components in contact with the fluid, the operability of the engine, or combinations thereof. For example, engine lube oil may be used to lubricate moving parts within an engine's power assembly as well as to drive hydraulic actuators on HEUI fuel injectors. And while the component life and operability of the HEUI injectors may benefit from less debris in the driving lubricating oil, the other lubricating functions may result in debris accumulation in the lubricating oil, for example, accumulation of metallic particles, solid-phase combustion products, or both. Further, HEUI injectors may be more sensitive to debris in the lubricating oil than other components in contact with the lubricating oil. Thus, HEUI injectors may benefit from higher filtration performance for the lubricating oil than is conventionally applied in applications that do not use lubricating oil to drive HEUI injectors.

Conventional approaches to improving filtration may include increasing filtration surface area, decreasing a characteristic pore size of filtration media, or both. However, Applicants discovered that conventional approaches to increasing lubricating oil filtration performance may not satisfy design constraints for spatial packaging envelopes, component cost, lifecycle maintenance costs, or combinations thereof. Instead, Applicants discovered that adding filtration recirculation loops according to aspects of the present disclosure may improve fluid filtration performance while simultaneously satisfying other design constraints.

According to aspects of the disclosure, a fluid flow rate through the recirculation pump 300 is maintained at a higher value than a fluid flow rate through the delivery pump 302. Accordingly, when a first fluid flow from the reservoir 144 exits the recirculation pump 300, the first fluid flow is split into a second fluid flow that proceeds to the recirculation loop 322 and a third fluid flow that proceeds to the inlet 330 of the delivery pump 302. The second fluid flow is filtered through the recirculation filter 304 before returning to the inlet 312 of the recirculation pump 300, where it is combined with additional fluid from the reservoir 144. Accordingly, a fluid parcel may recirculate through the recirculation filter 304 multiple times before proceeding to an engine component 142 via the delivery pump 302 and the delivery filter 306. As a result, the multiple passes through the recirculation filter 304 remove additional debris with each pass, thereby improving filtration performance to promote life and operability of engine components 142. And unlike conventional approaches to improving filtration performance, the recirculation loop 322 may be effected within packaging and cost constraints.

Applicants discovered that sufficient fluid filtering could be achieved within the aforementioned packaging, cost, and maintainability constraints by operating the recirculation pump 300 a flow rate that is at least twice as high as the flow rate through the delivery pump 302. According to another aspect of the disclosure, the flow rate through the recirculation pump 300 is greater than or equal to five times the flow rate through the delivery pump 302.

According to another aspect of the disclosure, the flow rate through the recirculation pump 300 is proportionally greater than a flow rate through the delivery pump 302.

The controller 130 may be configured to operate the recirculation pump 300 at a flow rate that is higher than a flow rate of the delivery pump 302, and the controller 130 may achieve this result in a number of ways depending upon the application.

Referring to FIG. 3, where both the recirculation pump 300 and the delivery pump 302 are driven by a single prime mover 308, the recirculation pump 300 may be selected to have a pumping characteristic such that, at the target pressure rise across the recirculation pump 300, the flow rate through the recirculation pump 300 is greater than the flow rate through the delivery pump 302, when the delivery pump 302 is also operated at its target pressure rise and the delivery pump 302 is operated at the same speed as the recirculation pump 300. Accordingly, for the aforementioned pumping characteristics and same-speed operation of the recirculation pump 300 and the delivery pump 302, the controller 130 is configured to operate the recirculation pump 300 at a higher flow rate than that of the delivery pump 302 by operating both the recirculation pump 300 and the delivery pump 302 at the same speed.

Alternatively, as discussed above, the prime mover 308 may include gearing 354, such that the recirculation pump 300 operates at a higher speed than the delivery pump 302 for any given operating speed of the prime mover 308. Accordingly, for the configuration where the recirculation pump 300 and the delivery pump 302 have substantially the same pumping characteristic, operating the recirculation pump 300 at a higher speed than the delivery pump 302, as a result of the gearing 354, the controller 130 may be configured to operate the recirculation pump 300 at a higher flow rate than that of the delivery pump 302 by operating the prime mover 308 at a given speed or range of speeds. Further, it will be appreciated that the gearing 354 may be combined with different pumping characteristics for the recirculation pump 300 and the delivery pump 302 to achieve the desired relative flow rates between the recirculation pump 300 and the delivery pump 302.

Referring now to FIG. 4, where the recirculation pump 300 and the delivery pump 302 are operated independently by separate prime movers 400 and 402, respectively, it will be appreciated that the controller 130 may be configured to tailor the flow rate of the recirculation pump 300 relative to the flow rate of the delivery pump 302 by operating the first prime mover 400 and the second prime mover 402 at different speeds. As discussed previously, the first prime mover 400 and the second prime mover 402 may be variable speed motors, for example, and the controller 130 may tailor the speeds of the first prime mover 400 and the second prime mover 402 to achieve the desired relative flow rates from the recirculation pump 300 and the delivery pump 302.

Alternatively, if one of the first prime mover 400 and the second prime mover 402 were a variable speed motor and the other were a fixed speed motor, the controller 130 could tailor the relative flow rates between the recirculation pump 300 and the delivery pump 302 by varying the speed of the motor having variable speed capability. Further still, if the first prime mover 400 and the second prime mover 402 were each fixed speed motors, then the fixed speeds of the two motors could be selected in combination with the pumping characteristics of the recirculation pump 300 and the delivery pump 302 to effect the desired relative flow rates between the recirculation pump 300 and the delivery pump 302. Accordingly, the controller 130 would be configured to operate the recirculation pump 300 at a higher flow rate than the delivery pump 302 by operating the two fixed speed prime movers 400, 402 at different respective fixed speeds.

While some conventional systems may effect so-called "kidney loop" operation with a separate system that recirculates fluid back to a reservoir, Applicants discovered packaging and cost advantages by incorporating the fluid recirculation loop 322 into the fluid conditioning system 140 without recirculation of the fluid all the way back to the reservoir 144. Instead, the recirculation loop 322 returns recirculated fluid to a point upstream of the inlet 312 of the recirculation pump 300 but downstream of the reservoir 144. In turn, Applicants have identified improvements in fluid system component service life, within established limits for fluid system packaging size and cost.

In the event that abnormal operation of the recirculation pump 300 prevents sufficient flow from the reservoir 144 to the inlet 330 of the delivery pump 302 via the recirculation pump outlet conduit 318, the bypass conduit 342 may provide sufficient flow to the delivery pump 302. In addition, the check valve 346 may prevent recirculation of fluid flow from the outlet 316 of the recirculation pump 300 to the inlet 312 of the recirculation pump 300 via the bypass conduit 342 during normal operation of the fluid conditioning system 140.

Any of the methods or functions described herein may be performed by or controlled by the controller 130. Further, any of the methods or functions described herein may be embodied in a computer-readable non-transitory medium for causing the controller 130 to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a machine, or combinations thereof, including other methods and functions not described herein.

It will be appreciated that the foregoing description provides examples of the disclosed structures and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A fluid conditioning system for an engine, comprising: a recirculation pump, an inlet of the recirculation pump being fluidly coupled to a reservoir via a first conduit; a delivery pump fluidly coupled in series with the recirculation pump; a recirculation filter; an outlet of the recirculation pump being directly fluidly coupled to an inlet of the delivery pump and the outlet of the recirculation pump being directly fluidly coupled to an inlet of the recirculation filter via a second conduit; an outlet of the recirculation filter being fluidly coupled to the first conduit, forming a recirculation loop; and the recirculation pump being configured to operate at a flow rate that is higher than a flow rate of the delivery pump, such that in operation, a portion of a fluid flow from the recirculation pump in excess of a flow through the delivery pump is directed through the recirculation loop.

2. The fluid conditioning system of claim 1, further comprising a bypass loop including a check valve,
   an outlet of the check valve being fluidly coupled to the second conduit,
   an inlet of the check valve being fluidly coupled to the first conduit, and
   the check valve being arranged along the bypass loop to allow flow only in a direction from the first conduit toward the second conduit.

3. The fluid conditioning system of claim 1, further comprising:
   a motor operatively coupled to the recirculation pump via a shaft; and
   a controller operatively coupled to the motor, the controller being configured to cause the flow rate of the recirculation pump to be higher than the flow rate of the delivery pump.

4. The fluid conditioning system of claim 3, wherein the controller is configured to cause the flow rate of the recirculation pump to be proportionally higher than the flow rate of the delivery pump.

5. The fluid conditioning system of claim 1, wherein a fluid path from the outlet of the recirculation pump to the inlet of the delivery pump, along a direction of fluid flow, does not include an additional reservoir.

6. The fluid conditioning system of claim 1, wherein the second conduit is mechanically fixed to the inlet of the delivery pump.

7. The fluid conditioning system of claim 1, further comprising a delivery filter, an inlet of the delivery filter being fluidly coupled to an outlet of the delivery pump.

8. The fluid conditioning system of claim 1, wherein the recirculation loop further includes a check valve, the check valve being arranged along the recirculation loop to allow flow only in a direction from the second conduit toward the first conduit.

9. An engine, comprising: a recirculation pump, an inlet of the recirculation pump being fluidly coupled to a fluid reservoir via a first conduit; a delivery pump fluidly coupled in series with the recirculation pump; a recirculation filter; an outlet of the recirculation pump being directly fluidly coupled to an inlet of the delivery pump and the outlet of the recirculation pump being directly fluidly coupled to an inlet of the recirculation filter via a second conduit; an outlet of the recirculation filter being fluidly coupled to the first conduit, forming a recirculation loop; the recirculation pump being configured to operate at a flow rate that is higher than a flow rate of the delivery pump, such that in operation, a portion of a fluid flow from the recirculation pump in excess of a flow through the delivery pump is directed through the recirculation loop; and an engine component defining a fluid flow path therein, the fluid flow path being fluidly coupled to an outlet of the delivery pump.

10. The engine of claim 9, wherein the fluid reservoir is a lubricant reservoir and the fluid flow path through the engine component is a lubricant flow path.

11. The engine of claim 9, wherein the delivery pump is operatively coupled to a shaft of the engine for transmission of shaft power therebetween.

12. The engine of claim 11, wherein the recirculation pump is operatively coupled to the shaft of the engine for transmission of shaft power therebetween.

13. The engine of claim 11, wherein the recirculation pump is operatively coupled to a motor via a shaft of the motor, the shaft of the motor being distinct from the shaft of the engine, and
   the engine further comprises a controller operatively coupled to the motor, the controller being configured to cause the flow rate of the recirculation pump to be greater than the flow rate of the delivery pump.

14. The engine of claim 9, wherein the recirculation pump is operatively coupled to a motor via a shaft of the motor, the shaft of the motor being distinct from the shaft of the engine, and the engine further comprises a controller operatively coupled to the motor, the controller being configured to cause the flow rate of the recirculation pump to be greater than the flow rate of the delivery pump.

15. The engine of claim 14, wherein the motor is an electric motor.

16. The engine of claim 9, further comprising a bypass loop including a check valve, an outlet of the check valve being fluidly coupled to the second conduit, an inlet of the check valve being fluidly coupled to the first conduit, and the check valve being arranged along the bypass loop to allow flow only in a direction from the first conduit toward the second conduit.

17. A method for conditioning a fluid associated with an engine, the method comprising: receiving a first fluid flow from a reservoir at an inlet of a recirculation pump; pumping the first fluid flow through the recirculation pump; splitting the first fluid flow into a second fluid flow and a third fluid flow directly downstream of an outlet of the recirculation pump; pumping the second fluid flow through a delivery pump that is directly fluidly coupled in series with the recirculation pump, a flow rate of the second fluid flow being less than a flow rate of the first fluid flow; filtering the third fluid flow through a recirculation conduit; and pumping the third fluid flow through the recirculation pump after the filtering the third fluid flow.

18. The method according to claim 17, wherein the pumping the third fluid flow through the recirculation pump includes combining the third fluid flow with a fourth fluid flow from the reservoir, and pumping the combined third fluid flow and fourth fluid flow through the recirculation pump.

19. The method according to claim 17, further comprising bypassing a fifth fluid flow from the reservoir, around the recirculation pump, and to an inlet of the delivery pump via a bypass conduit including a check valve.

20. The method according to claim 17, further comprising adjusting a flowrate through the recirculation pump such that the flowrate through the recirculation pump is proportionally greater than a flowrate through the delivery pump.

* * * * *